Patented July 14, 1931

1,814,288

UNITED STATES PATENT OFFICE

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT

PROCESS FOR CONTROLLING THE VULCANIZATION OF RUBBER AND SIMILAR MATERIALS AND PRODUCTS OBTAINED THEREBY

No Drawing. Original application filed June 25, 1923, Serial No. 647,757. Divided and this application filed November 1, 1927. Serial No. 230,391.

This invention relates to processes for controlling the vulcanization of rubber and similar materials such as balata, gutta percha and synthetic rubber, and products obtained thereby. It is more particularly directed to processes for checking such vulcanization of rubber or the like combined with a vulcanizing agent, a material containing carbon disulphide, zinc or equivalent metal in combination and an amine or any one or more of such substances, and causing vulcanization thereafter if desired; and to products obtained thereby.

The principal object of the present invention is to provide a process for checking the vulcanization of rubber which shall be simple and efficient, particularly in causing sure curbing or checking of vulcanization of rubber in any form including latex, cements or solid rubber whether applied to untreated rubber before vulcanization, to rubber containing one or more vulcanizing or other ingredients, or to rubber which has been partially or completely vulcanized while permitting easy resumption of vulcanization, at normal temperature 70° F. or above, say 212° F., or 240–286° F., later if desired. Another object of the invention is to provide a series of products resulting from such processes in which such control has been exercised and which therefore may be more readily manipulated in factory processes without danger of prevulcanization and which will result in rubber articles having improved physical characteristics such as better resistance to ageing.

The invention accordingly comprises a process for controlling the vulcanization of rubber which includes causing a vulcanizing ingredient contained in rubber to react with a substance for checking the vulcanizing function of the ingredient and at will treating the rubber with an agent causing vulcanization, and the products obtained thereby.

This application is a division of Serial Number 647,757, filed June 25, 1923, now U. S. Patent No. 1,698,715.

The term "agent" as herein employed is intended to include both chemical substances and physical forces such as heat.

The term "vulcanizing ingredient" as employed herein is intended to include a substance which is a component part of any combination or mixture which is capable of vulcanizing rubber.

In accordance with copending application No. 574,780, filed July 13, 1922, continued in applications Nos. 41,875, filed July 6, 1925, 681,066, filed Dec. 17, 1923 and copending application No. 574797, filed July 13, 1922, now Patent No. 1,463,794, it has been shown that vulcanization at ordinary temperatures, approximately 70° F., occurs when four ingredients, M in combination, an amine, a material comprising sulphur and a material comprising carbon disulphide or carbon oxysulphide are present. (Above the ordinary temperature, say ranging upwards to 212° F. or 240–286° F. vulcanization in the presence of these substances occurs at an increased rate.) M represents zinc or mercury in the mercuric state when vulcanization at ordinary temperatures, approximately 70° F., is carried out, and when vulcanization above ordinary temperatures, the preferred metals are the following: zinc, mercury, preferably in the mercuric state, cadmium, copper, preferably in the cupric state, arsenic, preferably in the arsenous state, manganese, preferably in the manganeous state and lead preferably in the plumbous state. It has been found in accordance with the present invention that the vulcanization accomplished by the presence of these ingredients may be controlled by controlling the vulcanizing function of any one of the ingredients by treating it, preferably in rubber, with a substance which reacts chemically therewith, preferably without removing the reaction product where solid rubber is employed although it may be removed later if desired, and that after such treatment to check the function, the vulcanization may be carried on in the presence of the other ingredients by the application of heat or by replacing the ingredient which was reacted upon by the same or another quantity of the same ingredient or another similar ingredient. The control of vulcanization in the manner constituting the present invention is particularly important in its action to prevent the premature vulcanization of rubber compounds containing accelerators and other vulcanizing ingredients which vulcanize at ordinary temperatures or slightly above. Taking the process of vulcanization set forth in Cadwell's copending application Sr. No. 441,691, filed Feb. 1, 1921, in which rubber, zinc oxide, sulphur and oxy normal butyl thiocarbonic acid disulphide are combined and the compound so formed subsequently exposed to the vapors of aniline, constituting the fourth, i. e. amine ingredient, to effect vulcanization, if this compound without exposure to aniline or other amine be allowed to stand for a period of time at ordinary temperatures vulcanization is apt to occur due it is believed to the action of the natural amine occurring in the rubber or to casual amine such as aniline picked up from the atmosphere of the factory, either of which may furnish the fourth ingredient required for vulcanization at ordinary temperatures. The premature vulcanization occurs for instance in scrap rubber, that is pieces of rubber—usually small pieces—resulting from cutting or other processes for the manufacture of various rubber articles. By the present invention such premature vulcanization is avoided. If the premature vulcanization mentioned occurs it causes a serious loss of money in factory operations. Furthermore if vulcanized rubber is treated by the present process to check further vulcanization of the rubber, it has been found that further vulcanization substantially does not occur and thereby the ageing properties of the rubber are greatly improved. In addition it has been found that the process may be applied to various types of raw rubber to produce a uniformity of vulcanization therein, for example various lots of smoked sheet vulcanize it has been found at varying speeds. By the application of the present process these varying speeds may be changed to a uniform speed. The uniformity of speed of vulcanization is important in that vulcanized articles having a uniform degree of vulcanization may be automatically secured.

Instead of causing reaction with natural or casual amine to occur in a compound containing rubber, zinc in combination, sulphur and oxy normal butyl thiocarbonic acid disulphide, either zinc in combination or the carbon disulphide-containing material for example oxy normal butyl thiocarbonic acid disulphide may be treated with a suitable substance to check its vulcanizing function. Upon suitable treatment thereafter vulcanization may be accomplished. For controlling the vulcanization by influencing the action of the zinc or similar metal, hydrogen sulphide may be employed or similar substance to form a less active compound. The zinc sulphide formed when hydrogen sulphide is used is a less active form of zinc in combination.

The substance for controlling the vulcanizing functions of these various vulcanizing ingredients leave the rubber substantially unchanged physically. The rubber may be employed in various states such as latex, raw rubber, or products intermediate between latex and raw rubber, such as rubber sponge, as set forth in United States patents of Ernest Hopkinson, 1,423,525 and 1,423,526; rubber which has been compounded and is ready for vulcanization and partially or fully vulcanized rubber. The treatment with the various materials mentioned above may be accomplished in various ways, such as by mixing mechanically with the rubber either by milling or similar process or by stirring in latex or cement. Or the various substances either in the gaseous, liquid or solid state may be absorbed by latex, raw rubber, rubber sponge, cements or vulcanized or vulcanizing rubber.

One embodiment of the invention is as follows: Mix latex preserved with 0.25% or more of ammonia sufficient to produce 100 parts of dry rubber with 1.5 parts of tetramethylthiuramdisulphide, 2 parts of zinc oxide, 3 parts of sulphur and 4 parts of ammonium sulphide. Vulcanization of the rubber obtained from this mixture by coagulation or otherwise is appreciably retarded. It may be resumed by adding 2 parts of zinc oxide and 1.5 parts of tetramethylthiuramdisulphide and heating the mixture to 212° F. for 60 minutes.

The above procedure finds special application in the production of thread. In the preparation of thread a mixture similar to the above without ammonium sulphide is employed. If for any reason a stoppage of the thread making machine occurs a supply of the latex thus compounded is on hand. 4 parts of ammonium sulphide may be added thereby preventing occurrence of vulcanization of the mass and rendering the latex available for other use.

As another illustration, 100 parts of rubber, 2 parts of zinc oxide, 2 parts of oxy normal butyl thiocarbonic acid disulphide, 2 parts of sulphur, are mixed by milling or otherwise. This compound in the form of masses of 0.1 inch thickness or less is placed in an atmosphere containing an excess of hydrogen sulphide gas for 24 hrs. whereupon it is removed. The zinc oxide reacts to form zinc sulphide which is a less active form of vulcanizing ingredient, and accordingly vulcanization of the mass is checked. The oxy normal butyl thiocarbonic acid disulphide is also decomposed. Vulcanization may be resumed by mixing 2 parts each of zinc oxide and oxy normal butyl thiocarbonic acid disulphide with the compound so treated and upon exposure of this mass to aniline vapor at 140° F. for 14 hrs. vulcanization is secured.

Instead of the treatment with aniline vapors to accomplish vulcanization of the compound may be immersed in a saturated aqueous solution of aniline for 12 hrs. and subsequently maintained at 212° F. in water or in air for 1 hr.

Instead of the treatment with aniline vapor to accomplish vulcanization a treatment with diethylamine vapor may be employed. In this case an amount of rubber is treated with an amount of diethylamine equivalent to 0.5% of the weight of the rubber.

Instead of treating the compound with aniline, diethylamine or the like after replacing the ingredient whose vulcanizing function has been checked, heat alone may be employed. In carrying out the heat treatment the compound whose vulcanization has been checked as above is placed in a chamber and maintained at a temperature of approximately 266° F. for 1 hr. at the end of which time vulcanization is accomplished.

The above procedure is particularly valuable where it is desired to temporarily discontinue the use of a compound such as given above, including rubber, zinc oxide, oxy normal butyl thiocarbonic acid disulphide and sulphur and to store the rubber until vulcanization thereof is to be carried out.

Instead of oxy normal butyl thiocarbonic acid disulphide mentioned in any of the above examples, the following vulcanizing ingredients may be substituted to be treated by the processes before mentioned herein: Zinc butyl xanthogenate, thiobenzoylmonosulphide, oxy ethylthiocarbonic acid disulphide and zinc dithiobenzoate in compounds or cements. The proportion of each of these materials preferably employed is as follows: 100 parts of rubber, 10 parts of zinc oxide, 3 parts of sulphur and from 0.1 to 3 parts of the zinc butyl xanthogenate, thiobenzoylmonosulphide, oxy ethylthiocarbonic acid disulphide or zinc dithiobenzoate.

It will be observed that oxy normal butyl thiocarbonic acid disulphide, zinc dithiobenzoate, zinc butyl xanthogenate, thiobenzoylmonosulphide, oxy ethylthiocarbonic acid disulphide are representatives of a large class of materials whose action may be controlled in a manner similar to that above set forth. This class of materials includes thiol salts, disulphides and monosulphides some of which are set forth in my Patents 1,440,962, 1,440,963, 1,440,964, 1,440,961 and my copending applications Sr. Nos. 548,828, 548,829, 548,831, now issued as U. S. Patents 1,532,226, 1,532,227 and 1,510,652 respectively. In the patents herein mentioned and in general where it is desired to control the vulcanization of rubber by chemically treating vulcanizing ingredients or particularly where it is desired to control the vulcanization of rubber containing sulphur and amine, zinc or equivalent metal, carbon disulphide or materials containing the group $$\overset{CS}{\underset{X}{\|}}$$

where X represents sulphur or a substitute element or group the processes herein set forth may be employed.

The processes herein set forth are simple and efficient. They cause either partial or complete stoppage of vulcanization when applied to the various types of rubber employed containing one or more vulcanizing ingredients. They permit easy resumption of vulcanization later, if desired. Furthermore a uniform rate of vulcanization may be established for different lots of raw rubbers such as smoked sheet by the processes described. The products resulting from the process may be manipulated without fear of premature vulcanization and as a result the difficulty of producing scrap rubber in factory operations which vulcanized before it could be reformed into articles and which represented accordingly a loss has been done away with. Products in which over-vulcanization has been prevented by the processes herein included have a correspondingly increased resistance to ageing.

Having thus described my invention, what I claim and desire to protect by Letters Patent is:

1. A process for controlling the vulcanization of rubber which comprises reacting upon an active metal M in combination, in the presence of an amine, a material containing the group $$\overset{CS}{\underset{X}{\|}}$$

and a sulphur-containing material in rubber, with a substance to check the vulcanizing action of the active metal M in combination, then treating the rubber with an active metal M in combination and vulvanizing the rubber.

2. A process for controlling the vulcanization of rubber which comprises reacting upon active zinc in combination, in the presence of carbon disulphide-containing material, sulphur and an amine in rubber with a substance to check the vulcanizing action of the active zinc in combination, then treating the rubber with a further quantity of active zinc in combination, and vulcanizing the rubber.

3. A process for controlling the vulcanization of rubber which comprises reacting upon an active metal M in combination, in the presence of an amine, a material containing the group $$\overset{CS,}{\underset{X}{\|}}$$

and a sulphur-containing material in rubber, with a sulphide to check the vulcanizing action of the active metal M in combination, then treating the rubber with an active metal M in combination, and vulcanizing the rubber.

4. A process for controlling the vulcanization of rubber which comprises reacting upon active zinc in combination, in the presence of carbon disulphide-containing material, sulphur and an amine in rubber with a sulphide to check the vulcanizing action of the active zinc in combination, then treating the rubber with a further quantity of active zinc in combination, and vulcanizing the rubber.

5. A process for controlling the vulcanization of rubber which comprises reacting upon active zinc in combination, in the presence of carbon disulphide-containing material, sulphur and an amine in rubber with a sulphide to form zinc sulphide to check the vulcanizing action of the active zinc in combination, then treating the rubber with a further quantity of active zinc in combination, and vulcanizing the rubber.

6. A step in the process of controlling the vulcanization of rubber in the presence of carbon disulphide containing material, sulphur, amine and active zinc in combination, which comprises reacting upon the active zinc in combination with a sulphide to check the vulcanizing function of the zinc and then at will vulcanizing the rubber by means of a vulcanizing "agent."

7. A step in the process of controlling the vulcanization of rubber in the presence of carbon-disulphide containing material, sulphur, amine and active zinc in combination, which comprises reacting upon the active zinc in combination with hydrogen sulphide gas to check the vulcanizing function of the zinc.

8. A process which comprises checking the vulcanization of rubber containing zinc oxide, a material containing the group $$\overset{CS,}{\underset{X}{\|}}$$

sulphur, and an amine with a substance adapted to convert the zinc of the oxide to a less active form and then supplying zinc oxide, and vulcanizing the rubber.

9. Vulcanized rubber derived from rubber containing active zinc in combination reacted upon to form zinc sulphide, carbon disulphide-containing material, sulphur and an amine, and then treated with a further quantity of active zinc in combination.

10. A vulcanized rubber product derived from rubber containing zinc oxide reacted upon by a sulphide, a material containing the group $$\overset{CS,}{\underset{X}{\|}}$$

sulphur and an amine and then treated with a further quantity of zinc oxide.

Signed at New York, county and State of New York, this 26th day of October, 1927.

SIDNEY M. CADWELL.